United States Patent
Stotts

(10) Patent No.: US 7,152,726 B2
(45) Date of Patent: Dec. 26, 2006

(54) LIVESTOCK LOADING CHUTE

(76) Inventor: F. LeRoy Stotts, Route 2, Box 98, Seiling, OK (US) 73663

( * ) Notice: Subject to any disclaimer, the term of this patent is extended or adjusted under 35 U.S.C. 154(b) by 0 days.

(21) Appl. No.: 10/692,701

(22) Filed: Oct. 24, 2003

(65) Prior Publication Data

US 2006/0191769 A1    Aug. 31, 2006

(51) Int. Cl.
*B65G 11/00*    (2006.01)
(52) U.S. Cl. .............. 193/5; 414/537; 14/71.5
(58) Field of Classification Search .............. 193/2 R, 193/5, 2 A; 414/537; 14/71.5; 296/61
See application file for complete search history.

(56) References Cited

U.S. PATENT DOCUMENTS

| | | | |
|---|---|---|---|
| 2,228,946 A | * | 1/1941 | Carter .................. 414/537 |
| 3,763,827 A | * | 10/1973 | Burkart .................. 296/61 |
| 3,929,104 A | * | 12/1975 | Corbin .................. 119/734 |
| 4,321,889 A | * | 3/1982 | Michaelsen et al. ........ 119/846 |
| 5,813,071 A | * | 9/1998 | Breslin et al. ............... 14/71.1 |
| 6,439,825 B1 | * | 8/2002 | Bonsall ...................... 414/537 |
| 6,537,016 B1 | * | 3/2003 | Bonsall ...................... 414/537 |

OTHER PUBLICATIONS

Author unknown, "Neville Built Trailers," "Livestock Trailers", date unknown, internet download 2003.
Author unknown, "McElroy Groundload Livestock Trailers," date unknown, internet download 2003.

* cited by examiner

*Primary Examiner*—James R. Bidwell
(74) *Attorney, Agent, or Firm*—Exclusivity-Law, Inc.; James T. Robinson

(57) ABSTRACT

A livestock loading chute is suitable for attachment to the rear frame of any dock loading livestock trailer to permit either dock loading or ground loading of livestock. The livestock loading chute includes an upper chute section, attached to the rear frame of the trailer, and a lower chute section, which is supported by the upper chute section. The upper chute section, which is aligned with the trailer's roll-up door, contains an upper chute section ramp adjustable between a horizontal position for dock loading and an inclined position for use in conjunction with the lower chute section for ground loading.

15 Claims, 13 Drawing Sheets

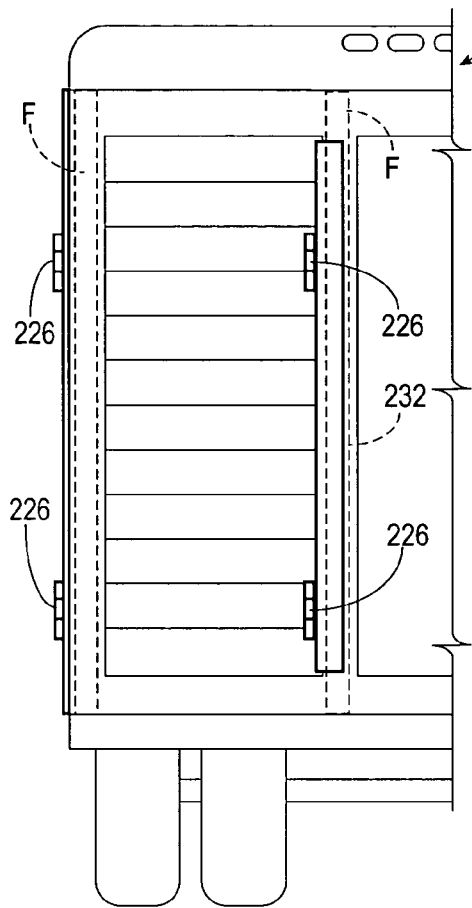
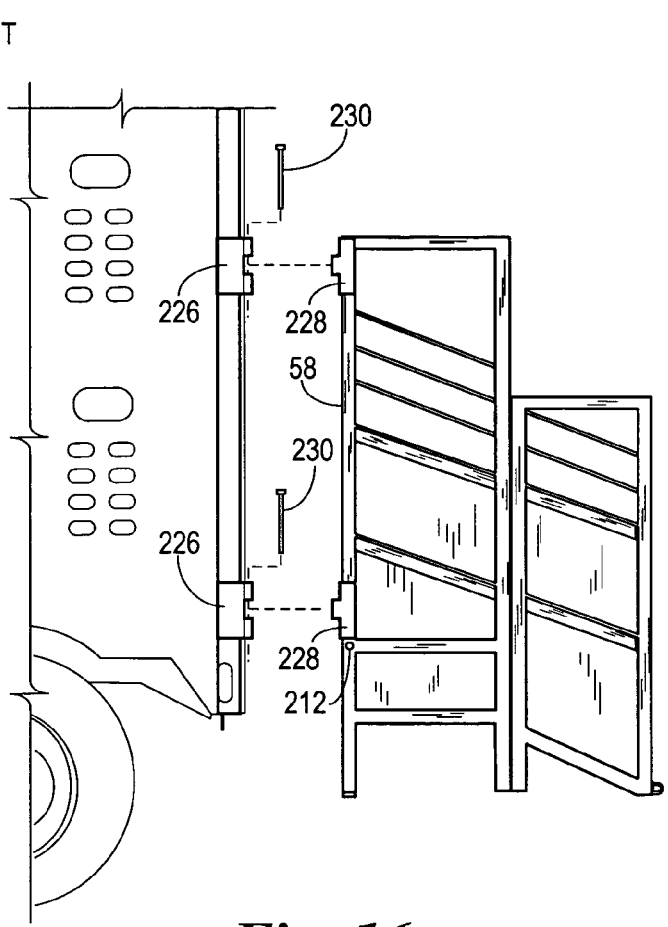
Fig. 15          Fig. 16
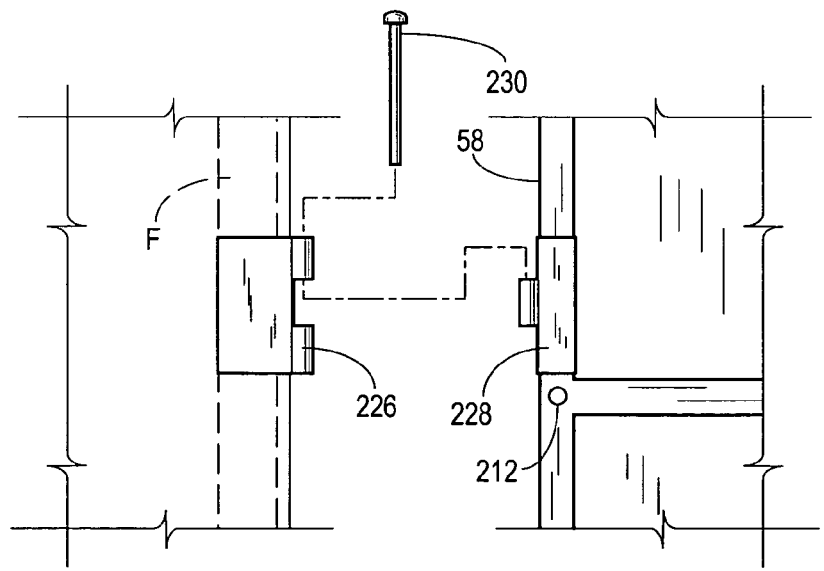
Fig. 17

LIVESTOCK LOADING CHUTE

BACKGROUND OF THE INVENTION

1. Field of the Invention

This invention relates generally to the field of livestock loading equipment, and more particularly, but not by way of limitation, to a retrofittable loading chute which converts a dock loading livestock trailer to a livestock trailer capable of loading livestock from the ground while retaining the capability of loading livestock from a dock.

2. Discussion

Double-deck livestock trailers, commonly referred to as "pot load trailers" or "cattle pots," have an internal ramp located at the rear of the trailer so livestock (most frequently cattle) can be moved from the lower floor to the upper floor. The pot load trailers are normally towed by a tractor using a kingpin connection. Most pot load trailers are dock loading trailers, i.e., they are designed for loading livestock by means of an entry ramp from a dock or an elevated chute. A typical entry height for a dock loading trailer is 40 inches. As used herein, the term "entry height" refers to the height of the entry ramp above the surface on which the trailer rests.

Many single-deck livestock trailers, also normally towed by a tractor using a kingpin connection, are suitable for dock loading only. The livestock are loaded into the single-deck livestock trailer from an elevated dock which may or may not match the entry height of the single-deck livestock trailer. Many single-deck livestock trailers accommodate ground loading by incorporating a drop-down box on the rear of the trailer. The addition of a drop-down box achieves an entry height of 14–16 inches. Because the box tends to drag over curbs and other ground-based obstacles, the box cannot be longer than about eight feet. For the overall length to remain under the 53-foot legal limit, the trailer must have a maximum length of 45 feet. In the alternative, a shorter box with a steeper internal ramp can be added to the trailer, but the shorter box results in a steeper internal ramp which creates livestock loading problems.

Another option for ground loading applications involves stock trailers designed to be towed by pickup trucks. The livestock (most frequently cattle) are loaded by means of an entry ramp directly from the ground into the trailer. A typical entry height for a ground loading stock trailer is 14 inches. Ground loading stock trailers cannot be used to load from a dock or portable loading chute.

Stockyards normally have "truck days" when primarily big trucks unload cattle at a dock. A livestock trailer limited to dock loading cannot unload to ground, so cattle haulers must frequently wait in line until a dock is available.

Similarly, stockyards normally have limited facilities for unloading livestock from ground loading stock trailers. A stock trailer which requires a ground loading facility cannot unload at a dock, and cattle haulers must wait in line until a ground loading facility is available.

Single-mode livestock trailers face a similar problem when picking up livestock from farms and ranches. A dock loading livestock trailer requires an elevated, or "dockload" chute, and a ground loading livestock trailer can load livestock only from the ground.

Most states limit the length of a trailer for use on non-interstate highways. Older pot load trailers of 46, 48, and 50 feet, and made of heavy gauge steel, are widely available for purchase at a fraction of the cost of a pickup truck to tow a ground loading livestock trailer. While the pot load trailers are capable of hauling a large number of cattle, pot load trailers are normally limited to loading livestock by a single mode, either ground load or dock load.

The applicant's livestock loading chute solves the problems of single-mode loading by providing a livestock loading chute which converts a dock loading livestock to a ground loading livestock trailer while retaining the trailer's ability to load livestock from a dock. When applicant's livestock loading chute is attached to a dock loading trailer, an unaided individual can switch from a dock loading configuration to a ground loading configuration—or from a ground loading configuration to a dock loading configuration—in about 30 seconds.

SUMMARY OF THE INVENTION

The livestock loading chute of present invention is suitable for attachment to the rear frame of any dock loading livestock trailer to permit either dock loading or ground loading of livestock. The livestock loading chute includes an upper chute section, attached to the rear frame of the trailer, and a lower chute section, which is supported by the upper chute section. The upper chute section, which is attached to the rear frame of the trailer in alignment with the trailer's roll-up door, contains an upper chute section ramp adjustable between a horizontal position (for dock loading) and an inclined position (for ground loading). The lower chute section is hinged to the upper chute section so the lower chute section swings around a rear corner of the upper chute section between a storage position, wherein the lower chute section is secured to the rear of the trailer alongside the upper chute section, and a ground loading position, wherein the lower chute section is aligned with the upper chute section. The lower chute section contains a lower chute section loading ramp which mates with the upper chute section ramp, when the upper chute section ramp is adjusted to the inclined position, to form a generally continuous ramp having an entry height of about 12 inches.

An object of the present invention is to provide a sturdy livestock loading chute which enables a livestock trailer to load and unload livestock either from a dock or from the ground.

Another object of the present invention is to provide a livestock loading chute for either ground loading or dock loading wherein the livestock loading chute can be manufactured as an integral part of a livestock trailer.

Yet another object of the present invention is to provide a livestock loading chute which permits an unaided individual to adjust the livestock loading chute between a ground loading position and a storage position for transport in about 30 seconds.

Yet another object of the present invention is to provide a livestock loading chute which enables a livestock trailer to load and unload livestock either from a dock or from the ground wherein the livestock loading chute is suitable for either steel or aluminum livestock trailers.

Yet another object of the present invention is to provide a livestock loading chute which enables a livestock trailer to load and unload livestock either from a dock or from the ground wherein the livestock loading chute can be retrofitted to an existing livestock trailer.

Yet another object of the present invention is to provide a livestock loading chute which enables a livestock trailer to load and unload livestock either from a dock or from the ground wherein the livestock loading chute adds no more than 3 additional feet to the length of the livestock trailer.

Other objects, features, and advantages of the present invention will become clear from the following description

BRIEF DESCRIPTION OF THE DRAWINGS

FIGS. 15–17 show another apparatus for attaching applicant's livestock loading chute invention to the rear frame of a livestock trailer.

DETAILED DESCRIPTION OF THE INVENTION

In the following description of the of the present invention, like numerals and characters designate like elements throughout the figures of the drawings.

Figure 1:
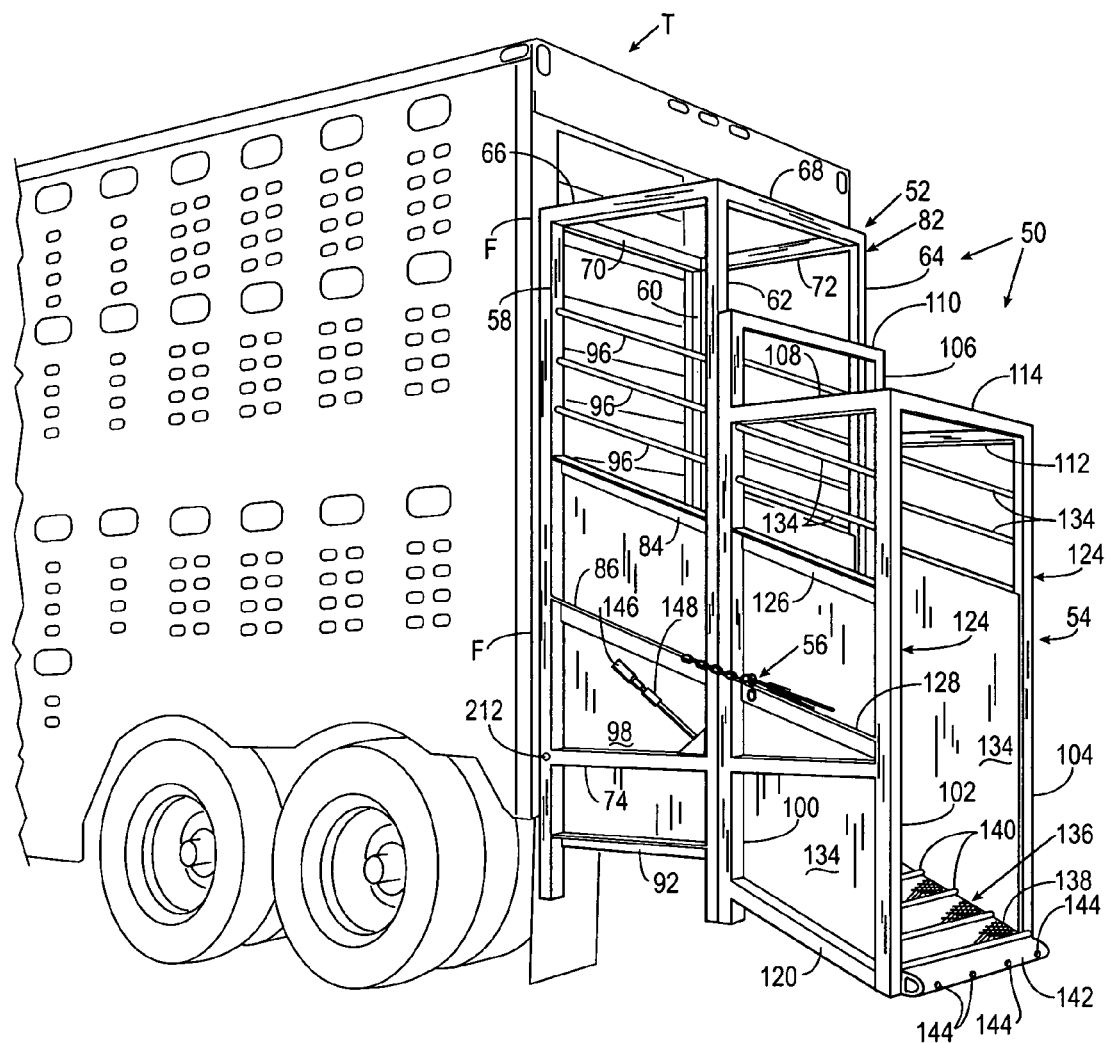
FIG. 1 shows the livestock loading chute of the present invention wherein the livestock loading chute is deployed in a ground loading position.
Figure 2:
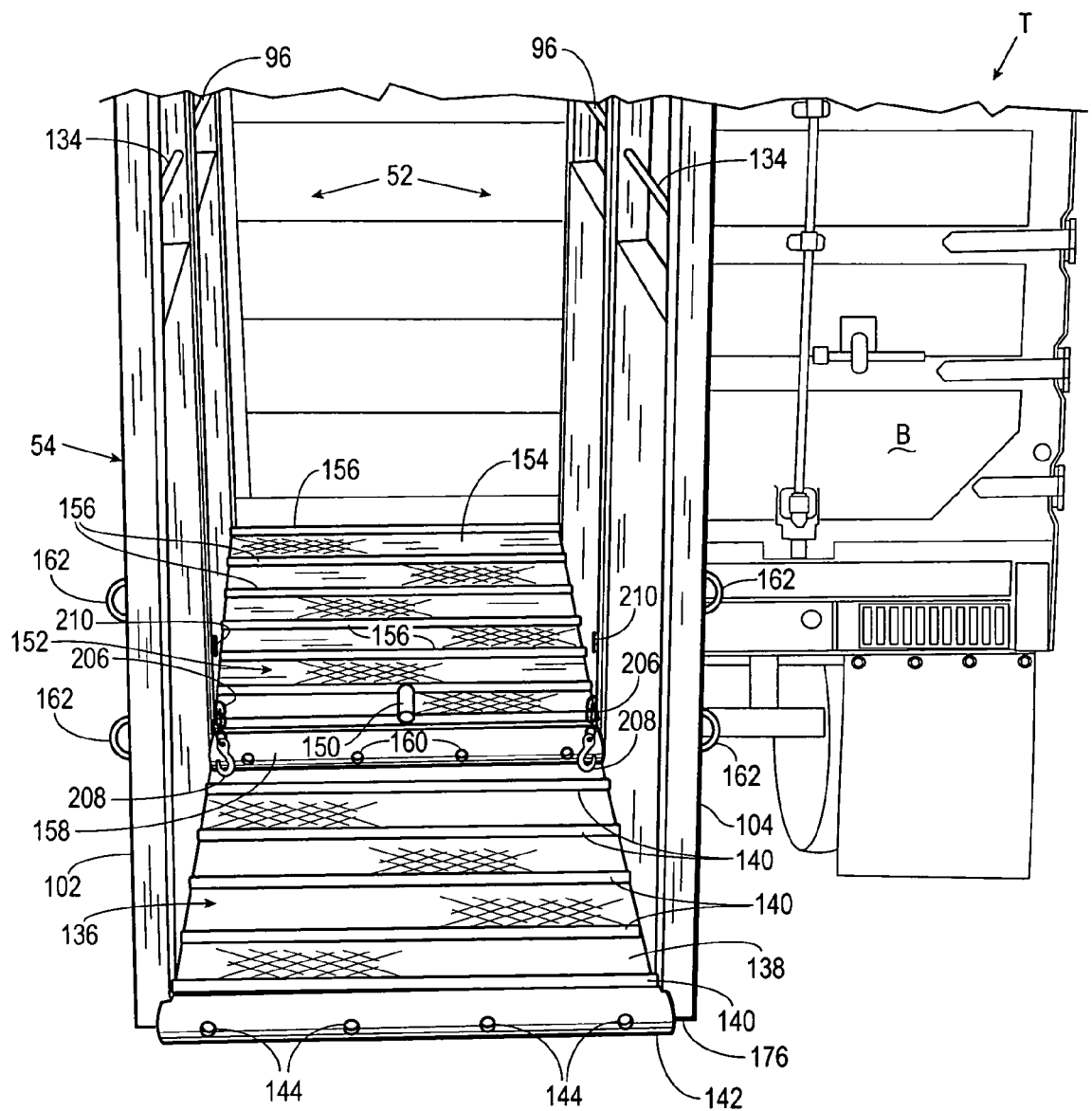
FIG. 2 is another view of the livestock loading chute shown of the present invention wherein the livestock loading chute is deployed in the ground loading position.
Figure 3:
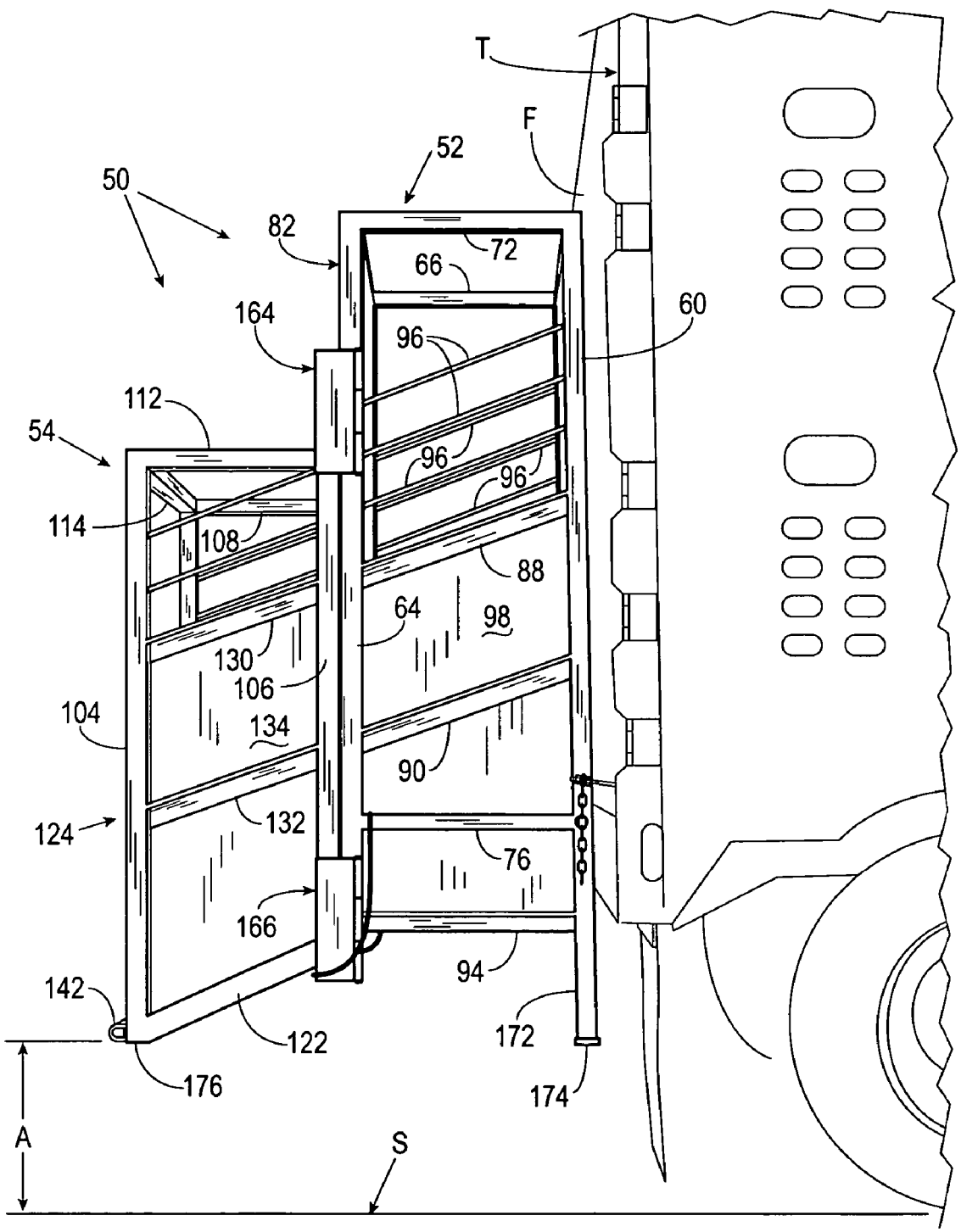
FIG. 3 is still another view of the livestock loading chute of the present invention wherein the livestock loading chute is deployed in the ground loading position.

Referring generally to the drawings and more particularly to FIGS. 1–3, a livestock loading chute 50 is shown in a ground loading position. An upper chute section 54 is welded to the rear trailer frame F of a potload livestock trailer T. A lower chute section 52 is aligned with the upper chute section 52 and secured to the upper chute section 52 by a boomer 56. It will be understood by one skilled in the art that a boomer is a device commonly utilized to secure cargo during shipment.

Still referring to FIGS. 1–3, vertical frame members 58, 60, 62, 64 cooperate with horizontal frame members 66, 68, 70, 72, 74, 76, 78, 80 (horizontal frame member 80 is not shown) to form an upper chute section frame 82. The upper chute section frame 82 is reinforced by diagonal braces 84, 86, 88, 90 and by horizontal braces 92, 94. Diagonal rods 96 extend between vertical frame members 58, 62 and between vertical frame members 60, 64 to prevent livestock from leaving the upper chute section 52 during the loading process. Upper chute section sides 98 on each side of the upper chute section 52 extend from the horizontal braces 92, 94 upwardly to the diagonal braces 84, 88, respectively.

Still referring to FIGS. 1–3, vertical frame members 100, 102, 104, 106 cooperate with horizontal frame members 108, 110, 112, 114, 116, 118 and also with diagonal frame member 120, 122 to form a lower chute section frame 124. The lower chute section frame 124 is reinforced by diagonal braces 126, 128, 130, 132. Lower chute section sides 134 extend between vertical frame members 100, 102 and between vertical frame members 104, 106 to prevent livestock from leaving the lower chute section 54 during the loading process. Lower chute section sides 134 on each side of the lower chute section 54 extend from the diagonal frame members 120, 122 upwardly to the diagonal braces 126, 130, respectively.

Figure 4:
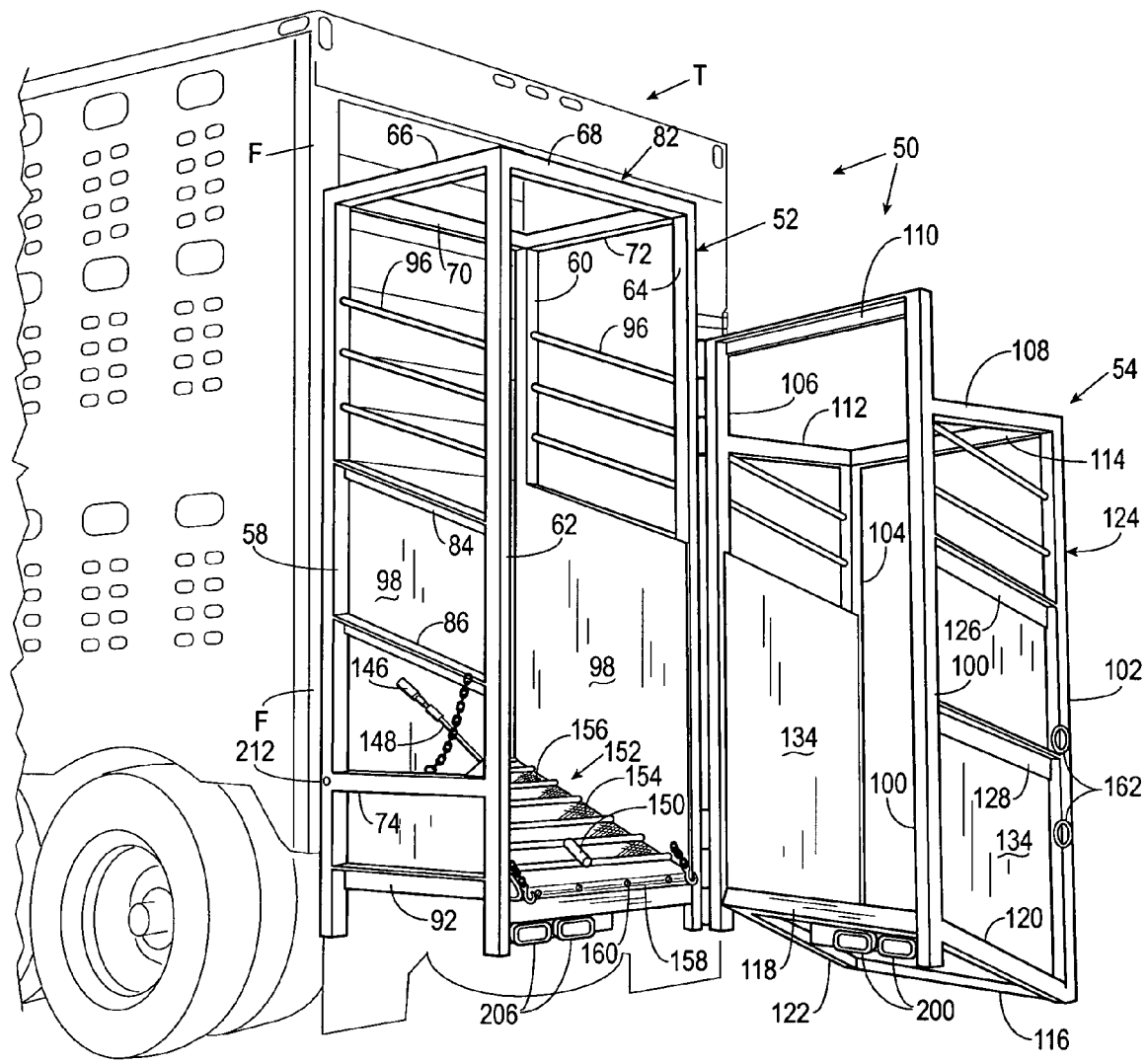
FIG. 4 shows the livestock loading chute of the present invention wherein the lower chute section is in an intermediate position between the ground loading position shown in FIGS. 1–3 and a transport position shown in FIGS. 6, 7, and 10.

Still referring to FIGS. 1–3, a lower chute section ramp 136 is formed by diamond plate 138 (sometimes also known as tread plate) attached to lower chute ramp horizontal frame members 116,118 (See FIG. 4). Transverse rods 140 welded to the diamond plate 138 serve as traction cleats for livestock. A rubber bumper 142 is attached to the lower chute horizontal frame member 116 by fasteners (not shown) deployed in throughways 144. The rubber bumper 142 protects the livestock from injury. The rubber bumper 142 also provides a cushion between the lower chute section 54 and the back B of the livestock trailer T when the lower chute section 54 is deployed in the transport position (See FIGS. 7 and 10).

Referring now to FIG. 1, a ramp adjustment lever 146 is stored in a ramp adjustment lever holder 148 for use in conjunction with a ramp jack 150 (See FIG. 2).

Referring now to FIG. 2, an upper chute section adjustable ramp 152 is formed by diamond plate 154 and transverse rods 156. The transverse rods 156, which are welded to the diamond plate 154, provide increased traction for livestock. A rubber bumper 158 is attached to an upper chute section ramp support (not shown) by fasteners (not shown) deployed in throughways 160. As shown in FIG. 2, the lower chute section ramp 136 and the upper chute section adjustable ramp 152 cooperate to form a continuous ramp to support livestock as the livestock move from the ground, upwardly across the lower chute section ramp 136, upwardly across the upper chute section adjustable ramp 152, and into the livestock trailer T.

Still referring to FIG. 2, D-rings 162 provide attachment points for securing the lower chute section 54 to corral gates or dock gates during the loading/unloading process.

Referring now to FIG. 3, the lower chute section 54 is attached to and supported by the upper chute section 52 by an upper hinge assembly 164 and a lower hinge assembly 166. In the presently preferred embodiment, each hinge assembly consists of two 5-inch by 18-inch plates and three 6-inch pipe sections. One plate of the upper hinge assembly 164 is attached to the lower chute section vertical frame member 106. The other plate of the upper hinge assembly 164 is attached to the upper chute section vertical frame member 64 so the 6-inch pipe sections are in vertical alignment. The lower hinge assembly 166 is similarly attached to the lower chute section vertical frame member 106 and the upper chute section vertical frame member 64.

Still referring to FIG. 3, shown therein are electrical wires 168, 170. The electrical wires 168, 170 provide power to brake lights and tail lights which are required in all states of the United States and in most foreign countries (See FIGS. 4, 6, 7, and 8).

In FIG. 3, the trailer T is supported by its wheels on a surface S. The rubber bumper 142 attached to the lower chute section ramp 136 is a distance A above the plane of the surface S. The distance A, representing the distance livestock must step up when entering the lower chute section ramp 136, is the entry height. In the presently preferred embodiment, the entry height A is about twelve inches.

Still referring to FIG. 3, a plate 172 is attached to the lower end 174 of the upper chute section vertical frame member 60. The plate 172 mates with and supports the lower end 176 of the lower chute section vertical frame member 104 when the lower chute section 54 is deployed in the transport position (See FIGS. 6–7).

Figure 5:
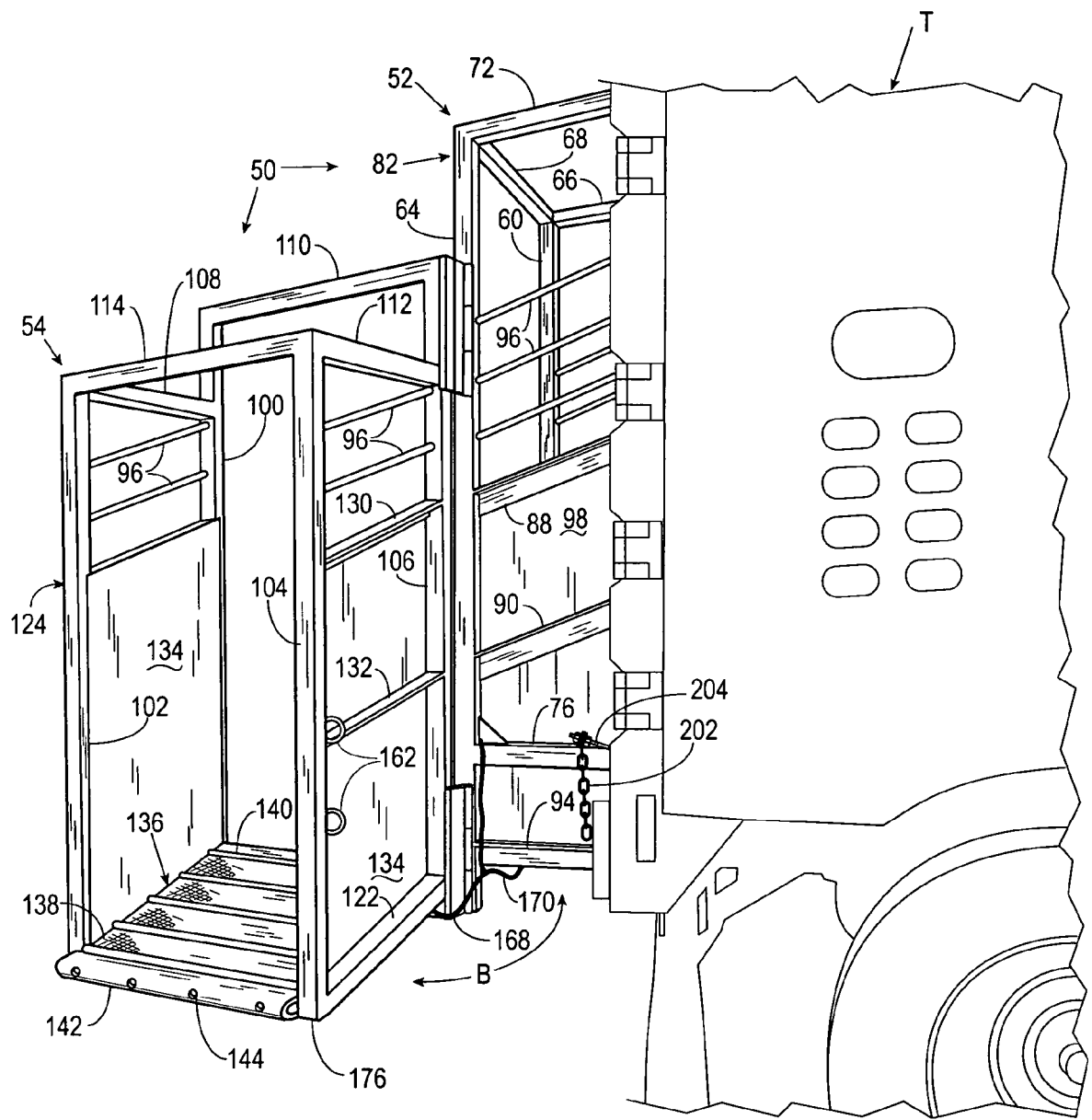
FIG. 5 is a the livestock loading chute of the present invention wherein the lower chute section is in an intermediate position between the ground loading position shown in FIGS. 1–3 and a transport position shown in FIGS. 6, 7, and 10.
Figure 6:
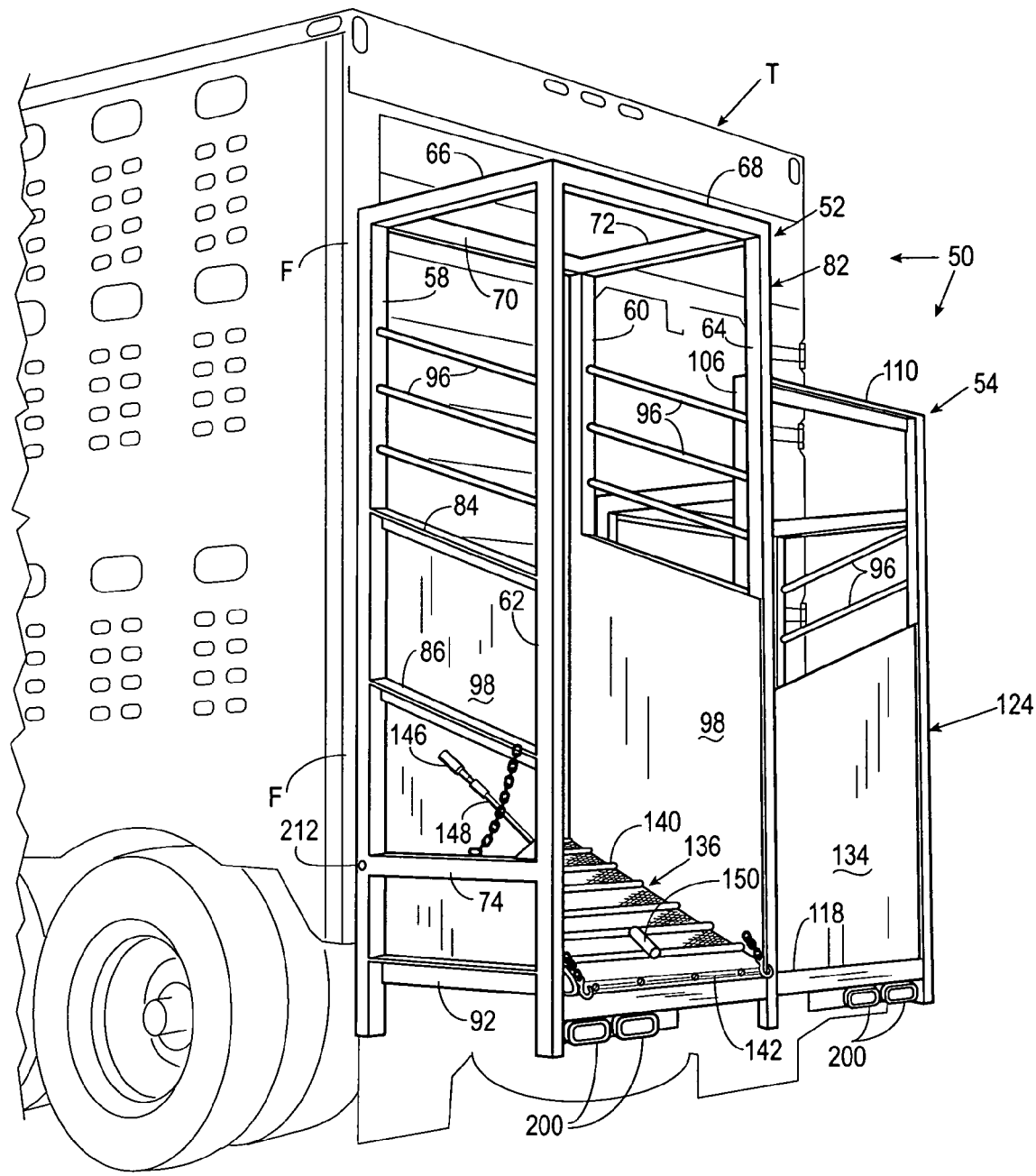
FIG. 6 shows the livestock loading chute of the present invention wherein the lower chute section is in a transport position.
Figure 7:
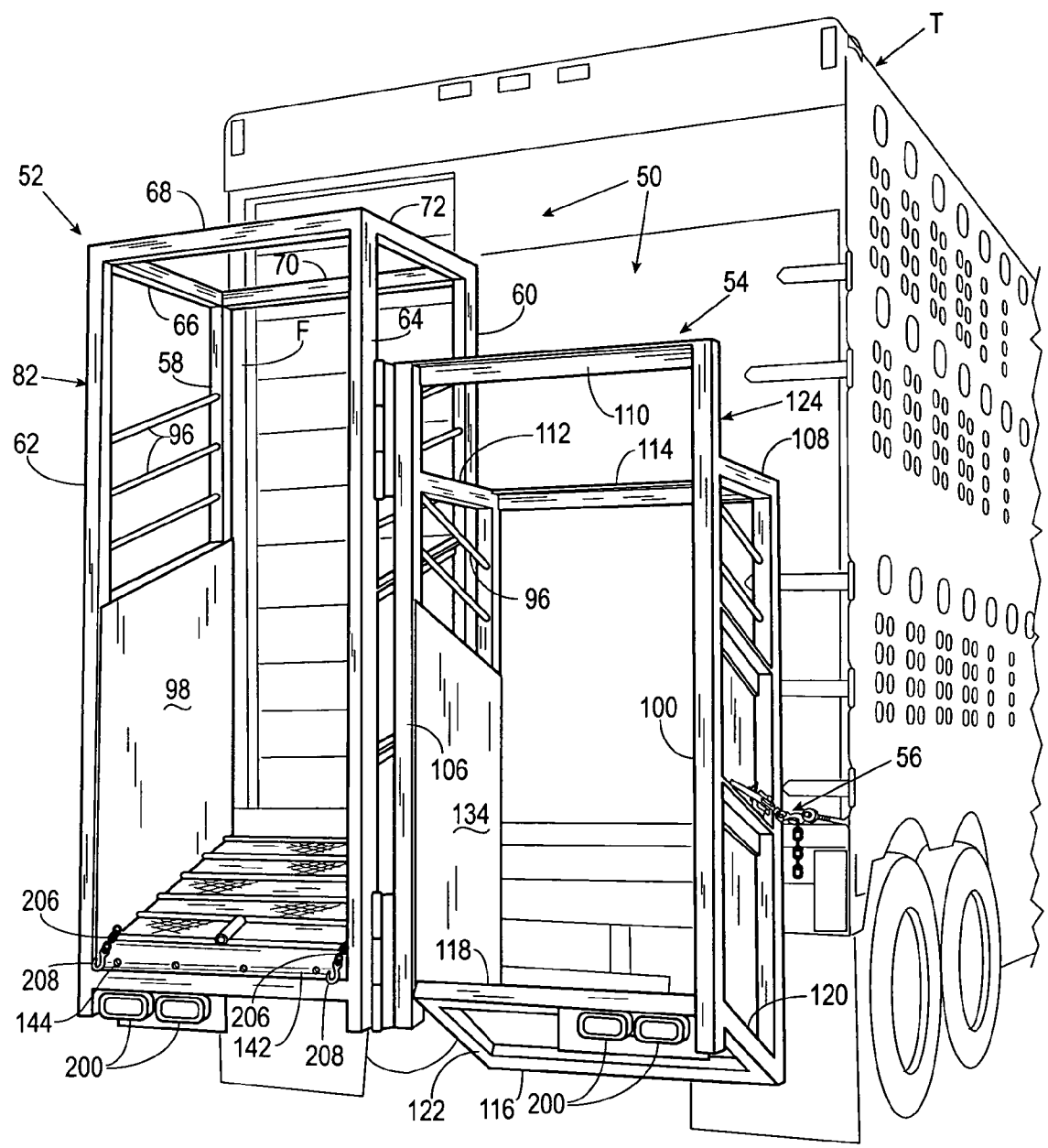
FIG. 7 is another view of the livestock loading chute of the present invention wherein the lower chute section is in a transport position.
Figure 10:
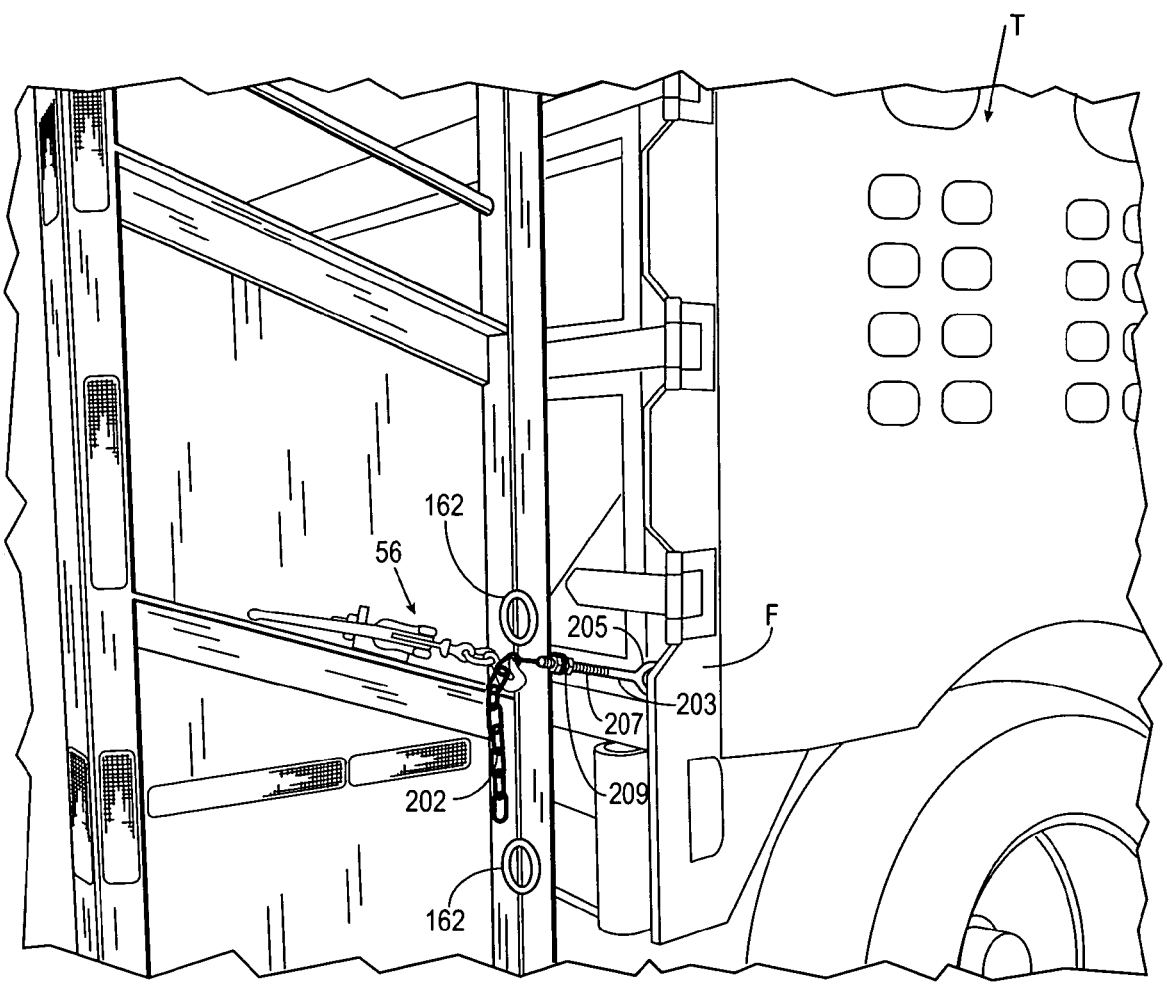
FIG. 10 is an enlarged view, partially cut away, of the lower chute section of the livestock loading chute of the present invention.

Referring now to FIGS. 4–5, the livestock loading chute of the present invention is shown in an intermediate position between the ground loading position shown in FIGS. 1–3 and the transport position shown in FIGS. 6, 7, and 10. The upper chute section adjustable ramp 152 is shown in the same position as in FIGS. 1–3, i.e., in a position for ground loading of livestock. Lights 200 provide brake lights and tail lights when the trailer T is traveling with the lower chute section 54 in the transport position.

Referring now to FIG. 5, the lower chute section 54 swings on hinge assemblies 164, 166 along B. A chain 202 attached to the rear portion 204 of the trailer T is used to secure the lower chute section 54 in the transport position.

Referring now to FIGS. 6–10, the livestock loading chute 50 of the present invention is shown in the transport position, i.e., in a position wherein the lower chute section 54 is secured to the trailer for travel on highways.

Referring now to FIG. 7, the boomer 56 is used to secure the lower chute section 54 to the rear of the truck T when the lower chute section 54 is in the transport position.

Figure 8:
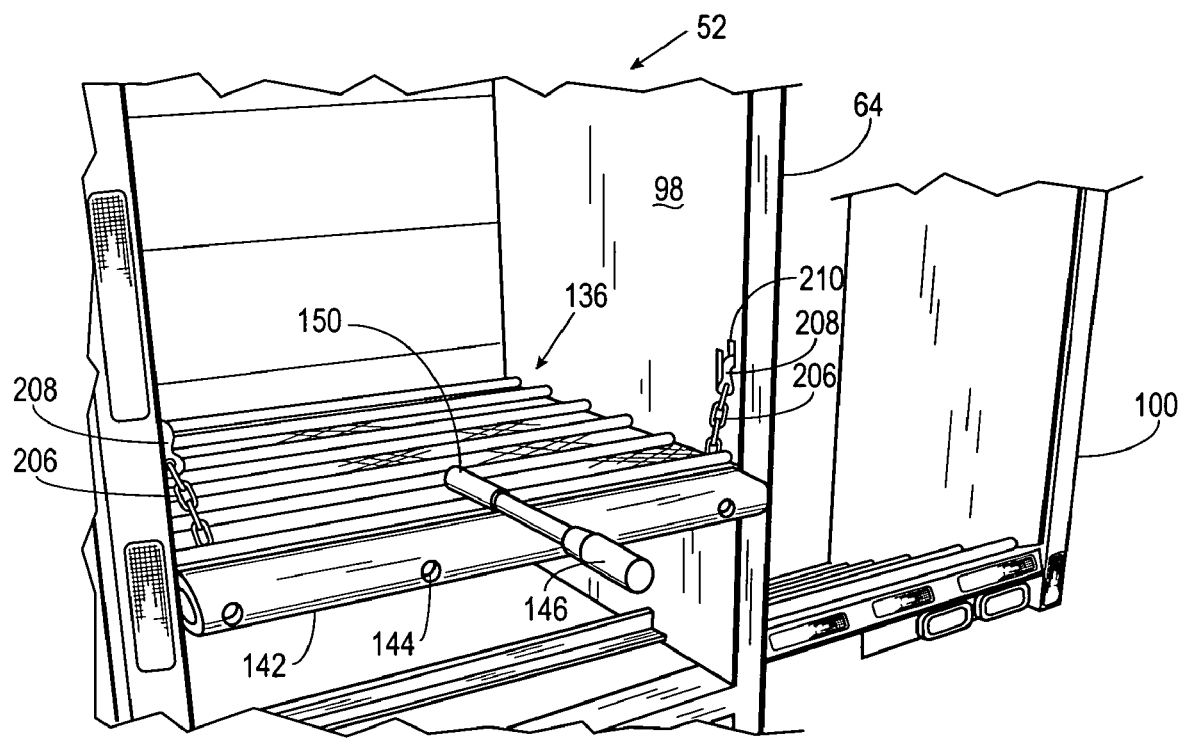
FIG. 8 is an enlarged view, partially cut away, of the upper chute section of the present invention.

Referring now to FIG. 8, an enlarged view of the upper chute section 52, partially cut away, shows the upper chute section adjustable ramp 152 in a horizontal dock loading position for loading livestock from a dock. The ramp adjustment lever 146 is engaging the ramp jack 150. Two chains 206 attached to the upper chute section adjustable ramp 152 terminate in hooks 208. The hooks 208 are received by slots 210 in the sides 98 of the upper chute section 52 to support the upper chute section adjustable ramp 152 in the horizontal position.

Figure 9:
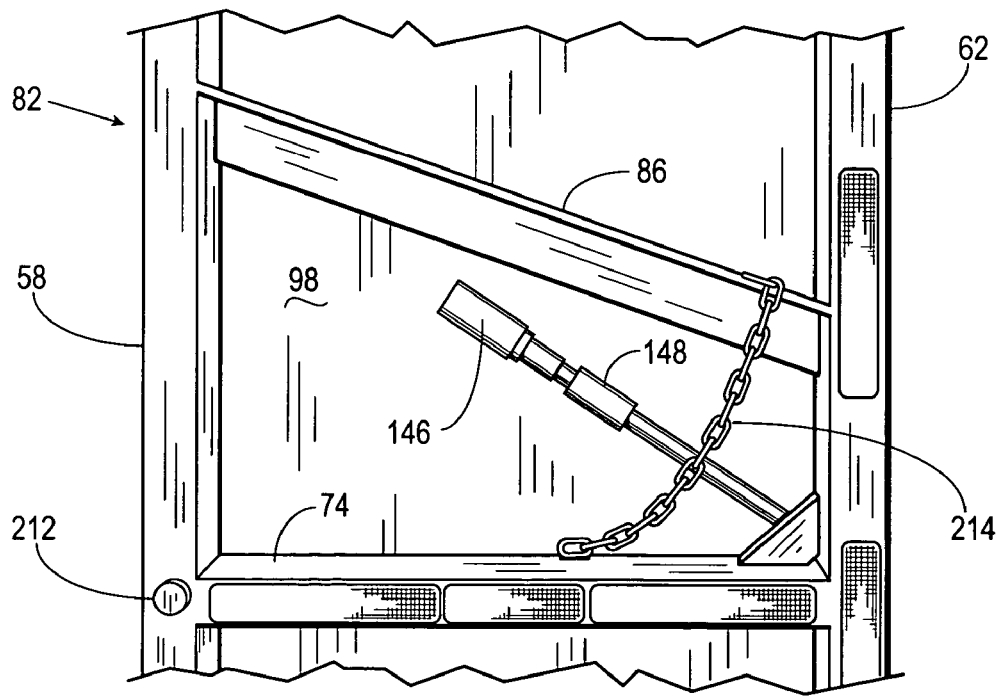
FIG. 9 is another enlarged view, partially cut away, of the upper chute section of the present invention.

Referring now to FIG. 9, an enlarged view of a portion of the upper chute section frame 82 shows the ramp adjustment lever 146 in the ramp adjustment lever holder 148. An upper chute section ramp pivot rod 212 provides a pivot for the upper chute section adjustable ramp 152 (See FIG. 11). A chain 214 us used in conjunction with the boomer 56 to secure the lower chute section 54 to the upper chute section 52.

Referring now to FIG. 10, an enlarged view of the lower chute section 54, partially cut away, shows the boomer 56 attached to the chain 202 to secure the lower chute section 54 to the rear of the trailer T in the transport position. The chain 202 is attached to a threaded eye-bolt 203 having an eye portion 205 and a threaded portion 207. The eye portion 205 of the threaded eye-bolt 203 is secured to the frame F of the livestock trailer T. An appropriate link in the chain 202 is placed over the threaded portion 207 of the eye-bolt 203 and held in place by a nut 209.

Figure 11:
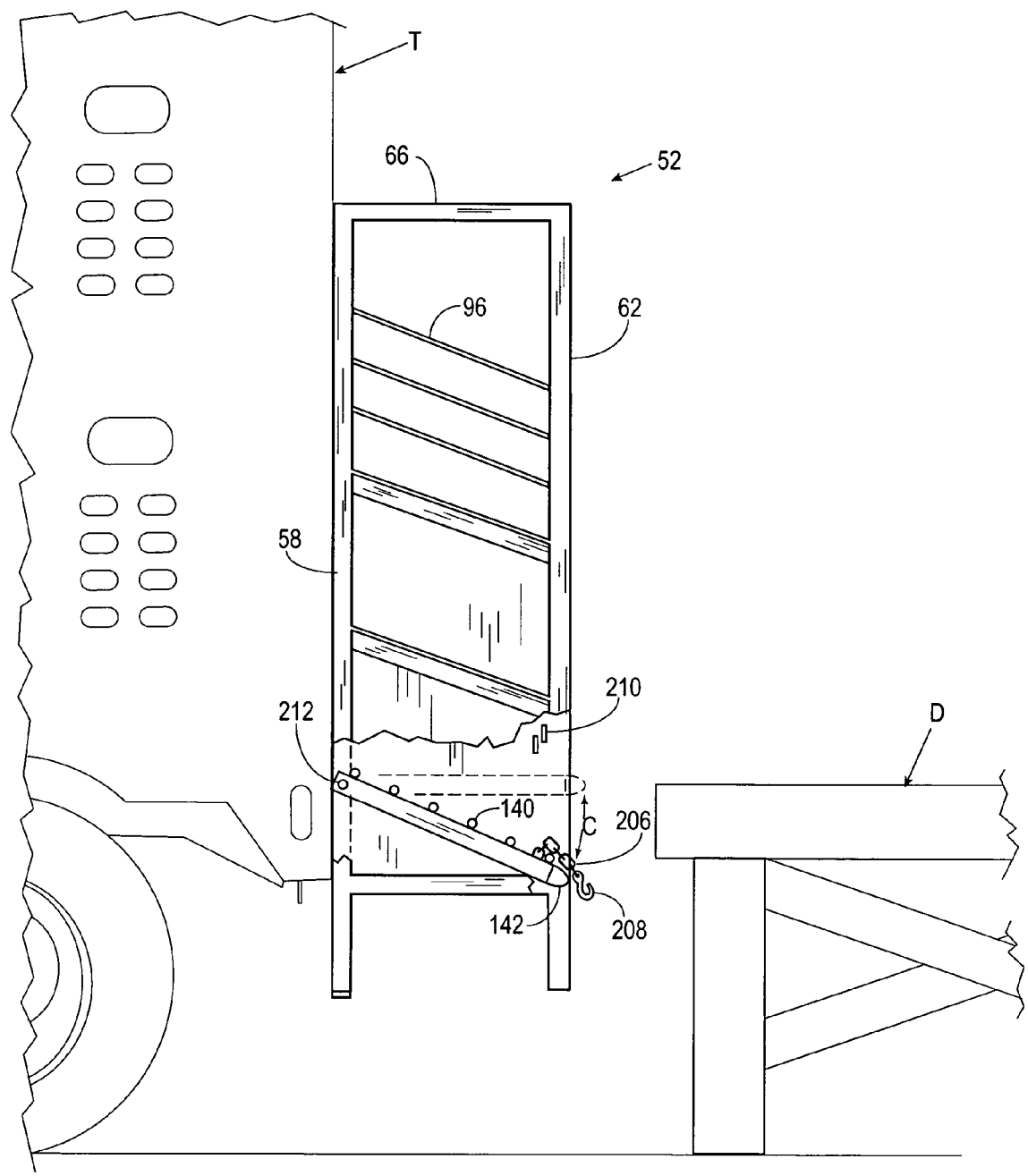
FIG. 11 is side view of the upper chute section of the present invention, partially cut away to show the upper chute section adjustable ramp.

Referring now to FIG. 11, the upper chute section adjustable ramp 152 pivots on the upper chute section adjustable ramp pivot rod 212. The rubber bumper 142 moves along C as the upper chute section adjustable ramp moves between a ground loading position, indicated in solid lines, and a dock loading position, indicated in phantom lines.

It will be understood by one skilled in the art that the livestock loading chute 50 of the present invention can be attached to the rear frame of a livestock trailer in a variety of ways. For the purposes of FIGS. 1–11, the livestock loading chute 50 is welded to the rear frame of the livestock trailer T. It will be further understood by one skilled in the art that the livestock loading chute 50 of the present invention can be constructed from steel, aluminum, stainless steel, or any convenient material compatible with the rear frame of the livestock trailer T.

Figure 12:
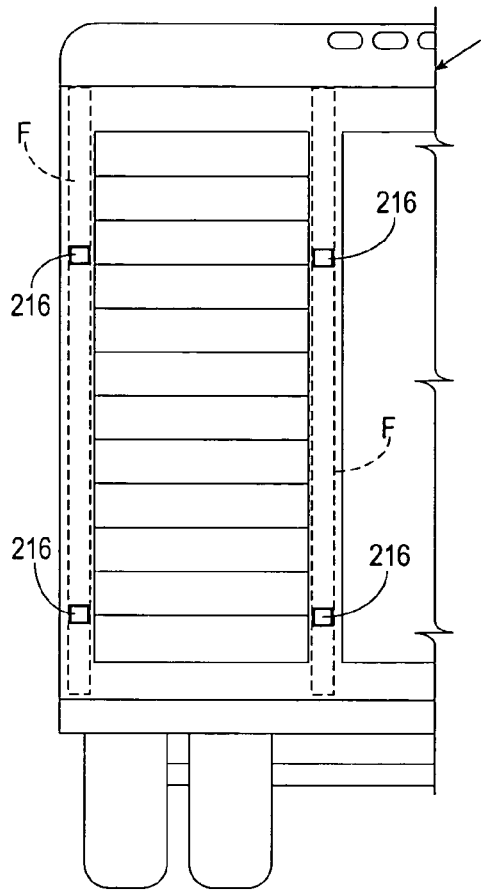
FIGS. 12–14 show apparatus for attaching applicant's livestock loading chute to the rear frame of a livestock trailer.
Figure 13:
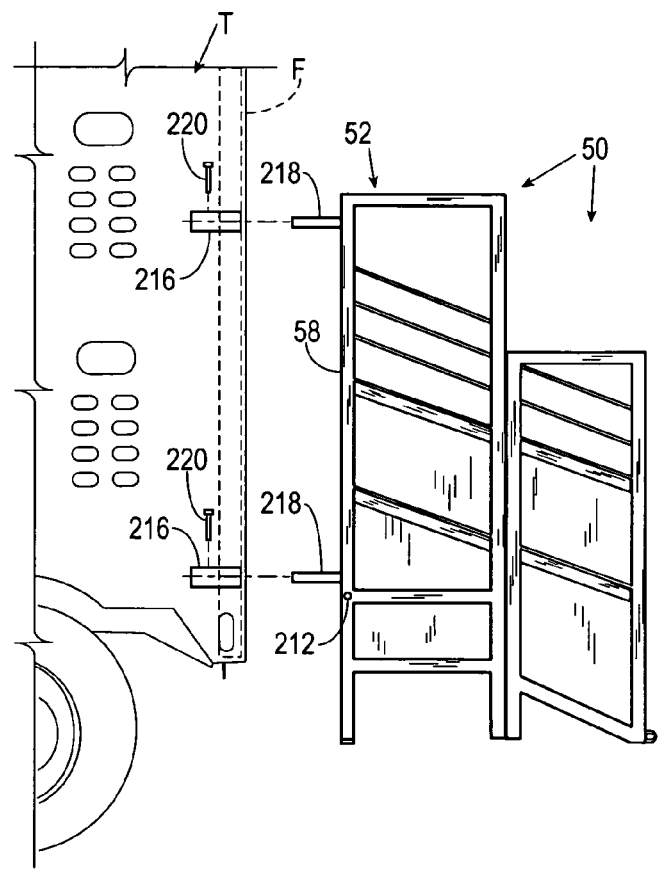
Figure 14:
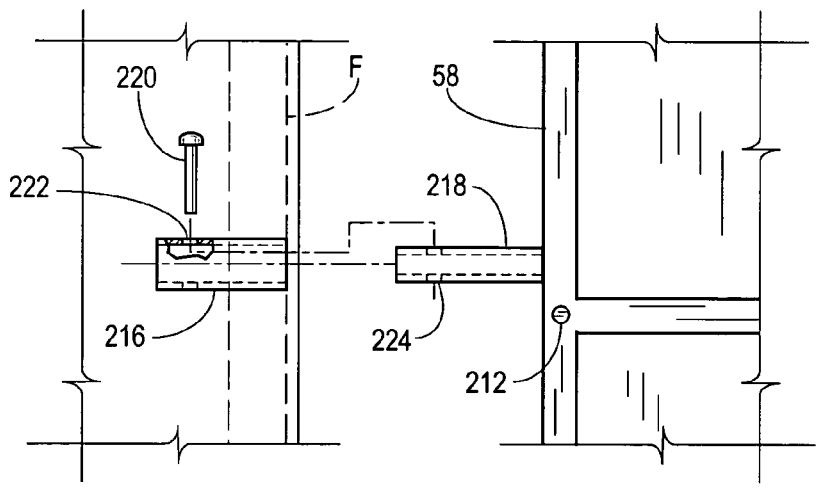

Referring now to FIGS. 12–14, four female receivers 216 welded to the rear frame F of the livestock trailer T receive mating male inserts 218 attached to the vertical frame members 58, 60 of the upper chute section frame 82. Latching pins 220 (See FIG. 14) extend through mating bores 222, 224 in the female receivers 216 and the mating male inserts 218, respectively to secure the livestock loading chute 50 to the rear frame F of the livestock trailer T.

Referring now to FIGS. 15–17, four hinge assemblies are used to attach the livestock loading chute 50 to the rear frame F of the livestock trailer T. Each hinge assembly includes a female receiver hinge plate 226, a male hinge plate 228, and a hinge pin 230. An L-shaped member 232 is welded to the center member of the rear frame F of the trailer T, and the two female receiver hinge plates 226 located near the center of the rear of the livestock trailer T are attached to the L-shaped member.

Figure 18:
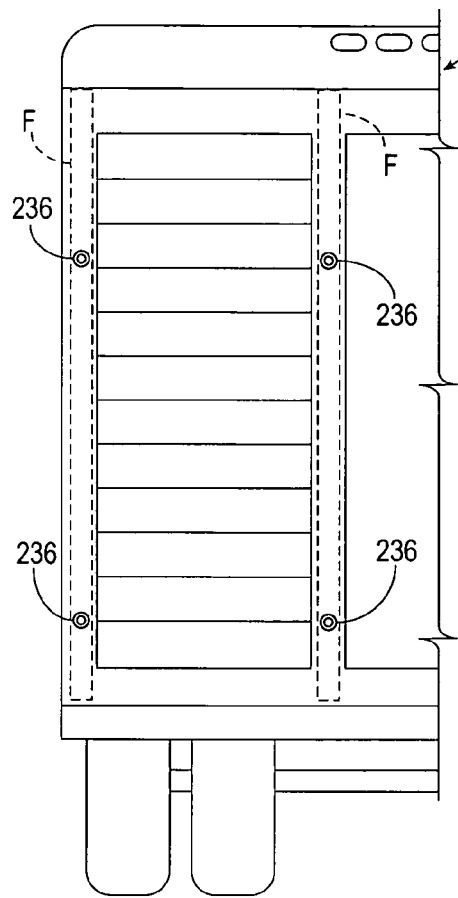
FIGS. 18–20 show still other apparatus for attaching applicant's livestock loading chute invention to the rear frame of a livestock trailer.
Figure 19:
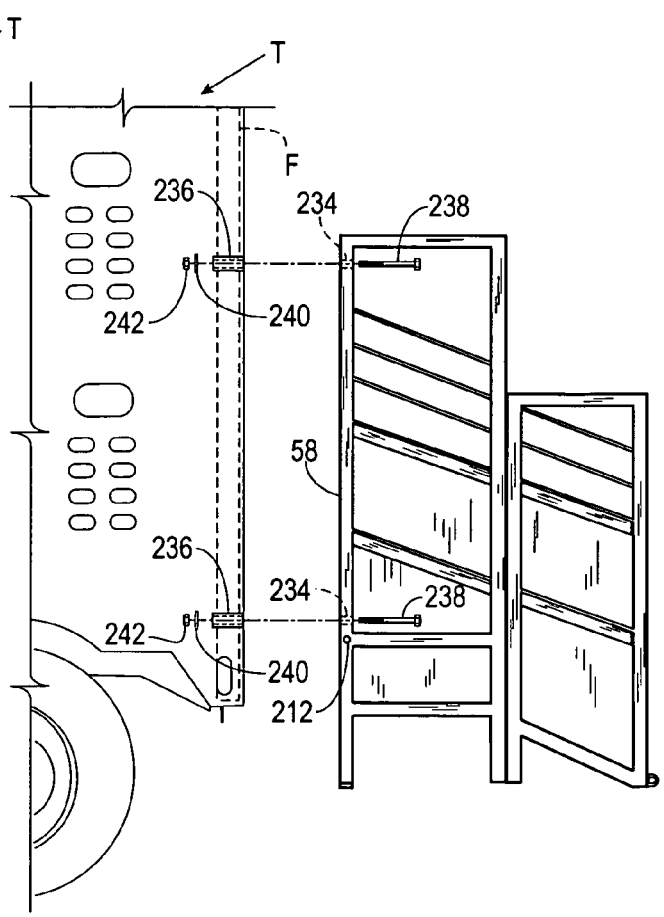
Figure 20:
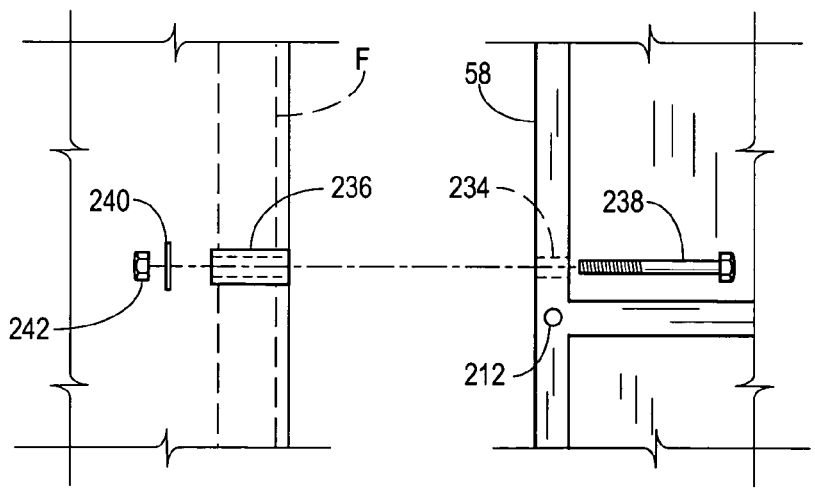

Referring now to FIGS. 18–20, the vertical frame members 58, 60 include four bores 234 (two bores 234 in each vertical frame member). Four sleeves 236 are welded to the rear frame F of the livestock trailer T in alignment with the four bores 234. A threaded bolt 238 is inserted simultaneously through each of the bores 234 and each of the sleeves 236. A washer 240 is placed on the threaded end of the threaded bolt 238 adjacent the sleeve 236. A nut 242 is tightened on the threaded bolt 238 to secure the livestock loading chute to the rear frame F of the livestock trailer T.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A livestock loading chute for attachment to a dock loading livestock trailer, the dock loading livestock trailer being characterized as having a trailer floor, a rear frame and a roll-up door contained within the rear frame of the dock loading livestock trailer, said livestock loading chute comprising:

an upper chute section attached to the rear frame of the livestock trailer, said upper chute section having an upper section adjustable ramp adjustable between a dock loading position wherein said adjustable ramp is essentially horizontal and a ground loading position wherein said adjustable ramp extends downwardly away from the rear of the dock loading livestock trailer; and a lower chute section attached to said upper chute section, said lower chute section having a lower chute section ramp extending downwardly away from said upper chute section, so that said upper chute section adjustable ramp in said ground loading position and said lower chute section ramp are generally aligned to provide a livestock loading path beginning about 12 inches above the ground and extending upwardly to within about six inches of the level of the floor of the dock loading livestock trailer.

2. The device of claim 1 wherein said lower chute section is attached to said upper chute section by a plurality of hinges so that said lower chute section swings on said hinges between a ground loading position wherein said upper chute section adjustable ramp and said lower chute section ramp are generally aligned and a transport position wherein said lower chute section is secured to a portion of the rear frame of the livestock trailer so that, when said lower chute section is secured in said transport position and said upper chute section adjustable ramp is adjusted to said dock loading position, said upper chute section provides a pathway for loading livestock from a dock.

3. The device of claim 1, wherein said upper chute section further comprises upper chute section sides to contain livestock within said upper chute section.

4. The device of claim 3, wherein said upper chute section adjustable ramp has an upper portion and a lower portion and wherein at least one of said metal sides has a slit therein, said device further comprising at least one chain attached to said lower portion of said upper chute adjustable ramp, said chain terminating in a chain hook, so that said chain hook is received by said slit when said upper chute section adjustable ramp to support said lower end portion of said upper chute adjustable ramp so that said upper chute section is in a generally horizontal position for loading livestock from a dock.

5. The device of claim 1, wherein said upper chute section adjustable ramp further comprises traction cleats attached to said adjustable ramp.

6. The device of claim 1 wherein said lower chute section ramp further comprises traction cleats attached to said lower chute section ramp.

7. The device of claim 1 wherein said upper chute section adjustable ramp further comprises a rubber bumper.

8. The device of claim 1, wherein said lower chute section ramp further comprises a rubber bumper.

9. The device of claim 1 wherein said upper chute section is welded to the rear frame of the livestock trailer.

10. A livestock loading chute for attachment to a dock loading livestock trailer, the dock loading livestock trailer being characterized as having a rear frame and a roll-up door contained within the rear frame, said livestock loading chute comprising:

an upper chute section having an upper chute section ramp therein, the upper chute section ramp being adjustable between a horizontal position for loading livestock from a dock and an inclined position whereby for loading livestock from the ground;

a foldaway lower chute section attached to the upper chute section and supported by the upper chute section, the foldaway lower chute section having a lower section ramp therein, the foldaway lower section deployable between a stored position against the rear of the livestock loading trailer and a ground loading position wherein the upper chute section ramp and the lower chute section ramp cooperate to form a pathway for loading livestock from the ground; and attachment means for attaching the upper chute section to the rear frame of the dock loading livestock trailer.

11. The device of claim 10 wherein said attachment means for attaching said upper chute section to the rear frame of the dock loading livestock trailer further comprises:

a plurality of female receivers attached to the rear frame of the dock loading livestock trailer, each said female receiver having a female receiver transverse bore therethrough;

a plurality of mating male inserts attached to the upper chute section, each said mating male insert having a male insert transverse bore therethrough, so that each of the mating male inserts is received into one of said female receivers and said receiver transverse bore aligns with said male insert transverse bore; and a plurality of latching pins, whereby one of said latching pins is disposed within aligned said receiver transverse bore and said male insert transverse bore, so each said male insert is secured within each said female receiver.

12. The device of claim 10 wherein said attachment means for attaching said upper chute section to the rear frame of the dock loading livestock trailer further comprises a plurality of hinge assemblies connecting said upper chute section to the rear frame of the dock loading livestock trailer.

13. The device of claim 10 wherein said attachment means for attaching said upper chute section to the rear frame of the dock loading livestock trailer, said upper chute section being further characterized as having an upper chute section frame including at least four upper chute section vertical frame members and at least four upper chute section horizontal frame members, said attachment means further comprising:

at least two sleeves attached to the rear frame of the dock loading livestock trailer;

at least one bore in each of two said upper chute section vertical frame members;

a threaded bolt disposed through each of said bores and through each of said sleeves;

a washer attached to each said threaded bolt, said washer being attached to each said threaded bolt forward of the rear frame in the dock loading livestock trailer; and a nut attached to each said threaded bolt, so that tightening of said nut on said threaded bolt secures said upper chute section to the rear frame of the dock loading livestock trailer.

14. A livestock loading chute for attachment to a dock loading livestock trailer, the dock loading livestock trailer being characterized as having a rear frame and a roll-up door contained within the rear frame, said livestock loading chute comprising:

an upper chute section;
a lower chute section; and
attachment means for attaching said upper chute section to the rear frame of the dock loading livestock trailer, the attachment means further comprising:

a plurality of female receivers attached to the rear frame of the dock loading livestock trailer, each said female receiver having a female receiver transverse bore therethrough;

a plurality of mating male inserts attached to the upper chute section, each said mating male insert having a male insert transverse bore therethrough, so that each of the mating male inserts is received into one of said female receivers and said receiver transverse bore aligns with said male insert transverse bore; and a plurality of latching pins, whereby one of said latching pins is disposed within aligned said receiver transverse bore and said male insert transverse bore, so each said male insert is secured within each said female receiver.

15. A livestock loading chute for attachment to a dock loading livestock trailer, the dock loading livestock trailer being characterized as having a rear frame and a roll-up door contained within the rear frame, said livestock loading chute comprising:

an upper chute section;

a lower chute section; and attachment means for attaching said upper chute section to the rear frame of the dock loading livestock trailer, wherein said attachment means for attaching said upper chute section to the rear frame of the dock loading livestock trailer, said upper chute section being further characterized as having an upper chute section frame including at least four upper chute section vertical frame members and at least four upper chute section horizontal frame members, said attachment means further comprising:

at least two sleeves attached to the rear frame of the dock loading livestock trailer;

at least one bore in each of two said upper chute section vertical frame members;

a threaded bolt disposed through each of said bores and through each of said sleeves;

a washer attached to each said threaded bolt, said washer being attached to each said threaded bolt forward of the rear frame in the dock loading livestock trailer; and a nut attached to each said threaded bolt, so that tightening of said nut on said threaded bolt secures said upper chute section to the rear frame of the dock loading livestock trailer.

* * * * *